United States Patent [19]
Kadono et al.

[11] Patent Number: 4,588,786
[45] Date of Patent: May 13, 1986

[54] PROCESS FOR PRODUCING WATER-SOLUBLE DICARBOXYLIC ACID IMIDE COMPOUNDS

[75] Inventors: Hiromitsu Kadono, Yokohama; Tadao Natsuume, Yokosuka, both of Japan

[73] Assignee: Nippon Zeon Co., Ltd., Tokyo, Japan

[21] Appl. No.: 658,417

[22] Filed: Oct. 5, 1984

[30] Foreign Application Priority Data

Oct. 6, 1983 [JP] Japan ................... 58-187490

[51] Int. Cl.$^4$ .................. C08F 22/02; C08F 22/04; C08F 22/06
[52] U.S. Cl. .................. 525/327.6; 525/329.6; 548/413; 548/415; 548/461; 548/513; 548/545; 548/546; 548/547; 548/548; 260/101
[58] Field of Search .................. 525/327.6, 329.6; 548/413, 415, 461, 513, 545, 546, 547, 548; 260/101

[56] References Cited

U.S. PATENT DOCUMENTS

| | | | |
|---|---|---|---|
| 2,182,178 | 3/1939 | Pinkernelle | 548/547 |
| 3,004,987 | 10/1961 | Paris | 548/546 |
| 3,163,603 | 12/1964 | LeSuer | 548/546 |
| 3,789,056 | 1/1974 | Pfirrmann | 548/545 |
| 3,910,951 | 10/1975 | Fuerst | 548/545 |
| 4,124,512 | 11/1978 | Stournas | 548/545 |
| 4,442,260 | 4/1984 | Larsen | 524/845 |

Primary Examiner—C. Warren Ivy
Attorney, Agent, or Firm—Sherman and Shalloway

[57] ABSTRACT

A process for producing a water-soluble dicarboxylic acid imide compound which comprises adding a primary amine compound to an aqueous solution of a water-soluble salt of a dicarboxylic acid compound containing at least one dicarboxylic acid unit capable of forming a 5-membered cyclic acid imide linkage and heating the mixture to introduce an acid imide linkage into the molecule.

10 Claims, No Drawings

PROCESS FOR PRODUCING WATER-SOLUBLE DICARBOXYLIC ACID IMIDE COMPOUNDS

This invention relates to a novel process for producing water-soluble compounds having an acid imide linkage. More specifically, it relates to a process for producing water-soluble dicarboxylic acid imide compounds from a water-soluble salt of a dicarboxylic acid compound capable of forming an acid imide linkage and a primary amine compound as starting materials, which has excellent operability, versatility and productivity.

Various water-soluble compounds derived from dicarboxylic acids capable of forming a 5-membered cyclic acid imide linkage, such as maleic acid, itaconic acid, citraconic acid and maleic anhydride have been known in the past. Specific examples include polymaleic acid; copolymers of maleic acid with vinyl monomers (e.g., ethylene, isobutene, amylene, diisobutylene, butadiene, styrene, vinyl acetate, and vinyl ether); adducts of unsaturated polymers such as polybutadiene, polyisoprene, polybutene and petroleum resins with maleic anhydride; and long-chain alkenylsuccinic acids. These compounds have found extensive use in the fields of paints, dispersants, water-treating agents, detergent builders, etc.

It is known to modify these water-soluble compounds for various purposes by imidizing a part of the dicarboxylic acid unit. For example, Japanese Laid-Open Patent Publication No. 66537/1977 discloses a method in which a maleinized polydiene is imidized with an alkylamine and then water-solubilized. U.S. Pat. No. 3,039,870, British Pat. No. 1,246,953 and Japanese Patent Publication No. 41208/1973 disclose a water-soluble polymer obtained by imidizing a part of a homopolymer or copolymer of an alpha,beta-unsaturated dicarboxylic acid with aminosulfonic acid.

Such acid imide compounds are produced generally by a method which comprises performing the reaction in organic solvents at high temperatures while dehydrating (the above-cited Japanese Laid-Open Patent Publication No. 55537/1977 and U.S. Pat. No. 3,039,870). This method, however, is undesirable since it requires a step of separating the solvent from the acid imide compound, and also gives rises to a problem of the toxicity of the solvent.

As a technique of remedying these defects, an improved method was developed which comprises adding a maleic anhydride-type polymer to an aqueous solution of a primary amine compound, or feeding them at a time, and reacting them at high temperatures (the above-cited British Pat. No. 1,246,953 and Japanese Patent Publication No. 41208/1973). This method can eliminate the aforesaid defects, but requires high reaction temperatures. The starting materials have generally low reactivity, and when the maleic acid-type polymer is dissolved in the reaction system, it frequently develops a phenomenon of becoming a sticky mass. Hence, the method has poor operability in stirring, etc. There is a great tendency to the occurrence of this phenomenon when a high-molecular-weight polymer or a copolymer of maleic anhydride with an alpha-olefin having a large number of carbon atoms, for example diisobutylene/maleic anhydride copolymer. Attempts to avoid this phenomenon require an unusually long period of time for the reaction. If the reaction temperature is elevated in an attempt to shorten the reaction time, decarboxylation of the polymer increases. Accordingly, this method is undesirable both in regard to operability and the quality control of the product. Furthermore, in the conventional methods, the starting material is limited to a maleic anhydride-type polymer, and it has not entirely been made clear whether such methods can equally be applied to polymers of alpha,beta-unsaturated dicarboxylic acids.

It is an object of this invention to remove these defects of the prior art. We have made extensive investigations, and found that a technique of first preparing an aqueous solution of a water-soluble salt of a dicarboxylic acid compound and then reacting it with a primary amine compound is a very effective means of achieving the above object.

Thus, according to this invention, there is provided a process for producing a water-soluble dicarboxylic acid imide compound which comprises adding a primary amine compound to an aqueous solution of a water-soluble salt of a dicarboxylic acid compound containing at least one dicarboxylic acid unit capable of forming a 5-membered cyclic acid imide linkage and heating the mixture to introduce an acid imide linkage into the molecule.

The dicarboxylic acid compound used as a starting material in this invention is a compound containing at least one dicarboxylic acid unit capable of forming a 5-membered cyclic acid imide compound, and usually has at least 8 carbon atoms. When this compound is a polymer, it has a number average molecular weight of usually 300 to 3,000,000, preferably 1,000 to 1,000,000.

Specific examples of the dicarboxylic acid compound include polymers of alpha,beta-unsaturated dicarboxylic acids or their anhydrides, such as maleic acid, itaconic acid and citraconic acid and their acid anhydrides (to be sometimes referred to as dicarboxylic acid monomers); copolymers of the above dicarboxylic acid monomers with such comonomers as ethylene, propylene, isobutylene, 1-butene, 2-methylbutene-1, diisobutylene, long-chain alpha-olefins, styrene, indene, 1,3-butadiene, isoprene, vinyl acetate, vinyl propionate, vinyl benzoate, methyl vinyl ether, vinyl butyl ether, acrylic acid, methacrylic acid, acrylamide, ethyl acrylate, methyl methacrylate and acrylonitrile; adducts of unsaturated polymers such as polybutadiene, polyisoprene, polybutene and petroleum resins with the dicarboxylic acid monomers; adducts of natural resins such as rosin with the dicarboxylic acid monomers; adducts of alpha-olefins such as decene-1, dodecene-1 and octadecene-1 with the dicarboxylic acid monomers, adducts of unsaturated natural oils such as linseed oil, dehydrated castor oil and soybean oil with the dicarboxylic acid monomers; and Diels-Alder adducts of conjugated diolefins such as 1,3-butadiene, 1,3-pentadiene, isoprene and cyclopentadiene with the dicarboxylic acid monomers.

In the present invention, water-soluble salts of these dicarboxylic acid compounds are used. Such water-soluble salts are formed between at least a part of the acid anhydride groups or carboxyl groups in these compounds and monovalent or polyvalent cations. Specific examples include salts of alkali metals such as sodium and potassium, salts of alkaline earth metals such as magnesium, calcium and barium, ammonium salts, salts of amines such as trimethylamine, triethylamine and triethanolamine. The alkali metal salts are most preferred in view of their economy and quality.

The primary amine compound may be any compound having a primary amino group. Specific examples include hydrocarbyl amines such as methylamine, ethyl-amine, butylamine, hexylamine, octylamine, dodecylamine, cyclohexylamine, aniline, benzylamine and naphthylamine; amino group-containing sulfonic acids or salts thereof, such as aminomethanesulfonic acid, aminoethanesulfonic acid, amino-2-methylpropanesulfonic acid, aminobutanesulfonic acid, anilinemonosulfonic acid, anilinedisulfonic acid, aminotoluenesulfonic acid, naphthylaminesulfonic acid, naphthylaminedisulfonic acid and naphthylaminetrisulfonic acid and salts of these; amino group-containing sulfuric acid monoesters or their salts, such as monoaminoethyl sulfate, monoaminobutyl sulfate, monoaminohexyl sulfate and monoaminooctyl sulfate and salts of these; amino group-containing tertiary amines such as aminoethyldimethylamine, aminoethyldiethylamine and aminopropyldimethylamine or their quaternary ammonium salts; and amino group-containing phosphonic acids or their salts, such as aminoethanephosphonic acid and aminopropanephosphonic acid and their salts.

In the process of this invention, a uniform aqueous solution of a salt of the dicarboxylic acid compound is first prepared. The aqueous solution can be easily obtained by dissolving the dicarboxylic acid compound in the form of a solid such as a powder or granules in an aqueous alkaline solution. When the dicarboxylic acid compound exists as an aqueous solution in its manufacturing process, or is sold on the market as an aqueous solution, it can be directly used.

The solids concentration of the aqueous solution can be properly selected. It is usually 5 to 60% by weight, preferably 10 to 50% by weight. If this concentration becomes excessively high, the viscosity of the reaction system increases and the reaction conversion tends to decrease.

Thereafter, the primary amino compound is added to the reaction system. This compound may be added in the form of a powder or an aqueous solution. Its amount is usually 0.05 to 1.5 moles, preferably 0.1 to 1 mole, per mole of the dicarboxylic acid monomer unit in the dicarboxylic acid compound.

The reaction of the two compounds proceeds efficiently by heating them at a temperature of usually at least 70° C., preferably 100° to 180° C., more preferably 130° to 180° C. The pH of the reaction system is not always uniform depending upon the kind of the primary amino compound used. It is usually in the range of 1 to 7, preferably 2 to 6.5. The other reaction conditions may be selected as desired. For example, the reaction time is 2 to 10 hours, and the reaction pressure is not more than 15 atmospheres. The mode of the reaction may be batchwise or continuous.

After the reaction, the product modified with the acid imide can be recovered in the form of an aqueous solution. As required, it may be recovered in the form of a solid such as a powder or granules by removing water in a customary manner.

These water-soluble dicarboxylic acid imide compounds are useful materials in the fields of paint binders, cosmetic additives, tanning agents, paint dispersants, dye dispersants, gypsum dispersants, drilling mud dispersants, soil conditioners, water-treating agents, etc.

According to this invention, the desired product can be obtained efficiently by a simplified process and simple operations. Furthermore, since the reactivity of the starting compounds is good, an adverse effect caused by the decarboxylation of the dicarboxylic acid compound can be prevented. Furthermore, the material to be reacted is not limited to maleic anhydride polymers, but high-molecular-weight polymers and long-chain alpha-olefins/maleic anhydride copolymers can also be reacted well by the process of this invention.

The following examples illustrate the present invention more specifically. All parts and percentages in these examples are by weight unless otherwise specified.

EXAMPLE 1

One hundred parts of a copolymer of 50 mole % of isobutylene and 50 mole % of maleic anhydride (compound I, number average molecular weight 100,000) and 57.8 parts (equimolar to the maleic anhydride monomer unit in the polymer) were used as starting materials, and reacted at each of the temperatures shown in Table 1 for 5 hours by the following procedure A or B while the concentration of the starting materials was maintained at 10%. During the reaction, the operability of the reaction and the state of foaming were observed. After the reaction, the amount of the unreacted aminoethanesulfonic acid was determined by high-performance liquid chromatography, and the reaction conversion was calculated. The results are shown in Table 1.

When the product was analyzed by IR, a doublet absorption (1700 and 1770 cm$^{-1}$) characteristic of the 5-membered cyclic imide linkage appeared strongly, whereas no absorptions assignable to the acid amide and the carboxylic acid were observed. It was therefore confirmed that the product was an imidization product.

Procedure A

An aqueous solution of a sodium salt of compound I was prepared, and aminoethanesulfonic acid was added. Sulfuric acid was added to adjust the pH of the solution to 6.

Procedure B

Compound I and aminoethanesulfonic acid were simultaneously added to an aqueous solution of sodium hydroxide, and then the pH of the solution was adjusted to 6.

TABLE 1

| Run No. | Invention 1-1 | Control 1-2 | Control 1-3 |
|---|---|---|---|
| Procedure | A | B | B |
| Reaction temperature (°C.) | 150 | 150 | 200 |
| Operability (*1) |  | X | X |
| Occurrence of forming (*2) |  |  | X |
| Conversion (%) | 100 | 40 | 60 |

(*1): The state of stirring was observed and evaluated by three grades as follows:
: Stirring was easy.
Δ: Stirring was slightly difficult.
X: A sticky mass formed, and an unusual torque was exerted.
(*2): Evaluated by the rise of the pressure of the reaction system as follows:
: Hardly rose.
Δ: Slightly rose.
X: Considerably rose

EXAMPLE 2

The same procedure as in Run No. 1—1 of Example 1 was repeated except that the reaction temperature and time were changed as shown in Table 2. The results are shown in Table 2.

TABLE 2

| Run No. | 2-1 | 2-2 | 2-3 |
|---|---|---|---|
| Reaction temperature | 80 | 130 | 170 |

TABLE 2-continued

| Run No. | 2-1 | 2-2 | 2-3 |
|---|---|---|---|
| (°C.) | | | |
| Reaction time (hours) | 15 | 9 | 5 |
| Conversion (%) | 50 | 100 | 100 |

EXAMPLE 3

The procedure of Run No. 1—1 of Example 1 was repeated except that the kind of the dicaroxylic acid compound was changed as shown in Table 3, and the solids concentration of the reaction system was changed to 40%. The results are shown in Table 3.

The amount of aminoethanesulfonic acid charged was equimolar to the maleic acid unit in the compound. In all runs, the product was an imidization product.

TABLE 3

| Run No. | 3-1 | 3-2 | 3-3 | 3-4 |
|---|---|---|---|---|
| Dicarboxylic acid compound (*) | II | III | IV | V |
| Conversion (%) | 100 | 100 | 100 | 100 |

(*): The dicarboxylic acid compounds were as follows:
II: Polymaleic acid (number average molecular weight 1,000)
III: Copolymer of equimolar proportions of maleic acid and acrylic acid (number average molecular weight 3,000)
IV: Adduct of 80 parts of liquid cis-1,4-polybutadiene having a number average molecular weight of 1,600 with 20 parts of maleic anhydride
V: Dodecenylsuccinic acid

EXAMPLE 4

Compound III was reacted with each of the imidizing agents indicated in Table 4 under the conditions shown there in accordance with procedure A. The amount of the imidizing agent was equimolar to the maleic acid unit in compound III. The concentration of the materials charged in the reaction system was 40%, and the reaction time was 5 hours.

TABLE 4

| Run No. | 4-1 | 4-2 | 4-3 | 4-4 | 4-5 |
|---|---|---|---|---|---|
| Imidizing agent | Amino-methane-sulfonic acid | Aniline-sulfonic acid | Mono-sodium anil-inedi-sulfo-nate | Mono-amino-ethyl sul-fate | Amino-propane-phospho-nic acid |
| pH of the reaction system | 6 | 6 | 2 | 6 | 6 |
| Reaction temperature (°C.) | 160 | 160 | 140 | 160 | 160 |
| Conversion (%) | 100 | 160 | 100 | 100 | 100 |

What we claim is:

1. A process for producing a water-soluble dicarboxylic acid imide compound which comprises adding a primary amine compound to an aqueous solution of a water-soluble salt of a dicarboxylic acid compound containing at least one dicarboxylic acid unit capable of forming a 5-membered cyclic acid imide linkage and heating the mixture at a temperature of above 100° C. and at a pH of 1 to 7 to introduce an acid imide linkage into the molecule.

2. The process of claim 1 wherein the dicarboxylic acid compound contains at least 8 carbon atoms and has a number average molecular weight of 300 to 3,000,000.

3. The process of claim 1 wherein the dicarboxylic acid compound is a polymer of an alpha,beta-unsaturated dicarboxylic acid or its anhydride.

4. The process of claim 1 wherein the dicarboxylic acid compound is a copolymer of an alpha,beta-unsaturated dicarboxylic acid or its anhydride with another comonomer.

5. The process of claim 1 wherein the dicarboxylic acid compound is an adduct of an unsaturated polymer, a natural resin, an alpha-olefin or an unsaturated natural oil with an alpha,beta-unsaturated dicarboxylic acid or its anhydride.

6. The process of claim 1 wherein the dicarboxylic acid compound is a Diels-Alder adduct of a conjugated diolefin with an alpha,beta-unsaturated dicarboxylic acid or its anhydride.

7. The process of claim 1 wherein the water-soluble salt of the dicarboxylic acid compound is an alkali metal salt, alkaline earth metal salt, ammonium salt or amine salt of the dicarboxylic acid compound.

8. The process of claim 1 wherein the primary amine compound is a hydrocarbyl amine, an amino group-containing sulfonic acid or its salt, an amino group-containing sulfuric acid monoester or its salt, an amino group-containing tertiary amine or its quaternary ammonium salt, or an amino group-containing phosphonic acid or its salt.

9. The process of claim 1 wherein the reaction is carried out at a temperature of 100° to 180° C.

10. The process of claim 1 wherein the primary amine compound is used in an amount of 0.05 to 1.5 moles per mole of the dicarboxylic acid monomer unit in the dicarboxylic acid compound.

* * * * *